(12) United States Patent
Kuwayama et al.

(10) Patent No.: US 9,555,856 B2
(45) Date of Patent: Jan. 31, 2017

(54) ELECTRIC FRONT DERAILLEUR

(71) Applicant: Shimano Inc., Sakai, Osaka (JP)

(72) Inventors: Kazuya Kuwayama, Osaka (JP); Atsuhiro Emura, Osaka (JP)

(73) Assignee: Shimano Inc., Osaka (JP)

( * ) Notice: Subject to any disclaimer, the term of this patent is extended or adjusted under 35 U.S.C. 154(b) by 255 days.

(21) Appl. No.: 13/849,866

(22) Filed: Mar. 25, 2013

(65) Prior Publication Data

US 2014/0287856 A1    Sep. 25, 2014

(51) Int. Cl.
*B62M 9/132*    (2010.01)
*B62M 9/1342*    (2010.01)

(52) U.S. Cl.
CPC ............ *B62M 9/132* (2013.01); *B62M 9/1342* (2013.01)

(58) Field of Classification Search
CPC ....... B62M 9/131; B62M 9/132; B62M 9/134; B62M 9/1342; B62M 9/1344; B62M 9/1346; B62M 9/10; B62M 9/12; B62M 9/121; B62M 9/122; B62M 9/124; B62M 9/1242; B62M 9/1244; B62M 9/1246; B62M 2009/12406
USPC .................................. 474/78, 79, 80, 81, 82
See application file for complete search history.

(56) References Cited

U.S. PATENT DOCUMENTS

| 7,900,946 | B2 | 3/2011 | Hara et al. | |
| 2002/0128097 | A1* | 9/2002 | Takebayashi | ................... 474/58 |
| 2007/0207885 | A1 | 9/2007 | Watarai | |

FOREIGN PATENT DOCUMENTS

CN    1676414 A    10/2005

* cited by examiner

*Primary Examiner* — Sang Kim
*Assistant Examiner* — Juan Campos, Jr.
(74) *Attorney, Agent, or Firm* — Global IP Counselors

(57) ABSTRACT

An electric front derailleur is provided with a base member, a movable member, a driving unit and a controller. The base member includes a bicycle mounting portion. The movable member moves with respect to the base member. The controller selectively operates the driving unit with one of a first mode which moves the movable member between a first end position and a second end position, and a second mode which moves the movable member between a third end position and a fourth end position. The controller operates the driving unit to selectively position the movable member at first, second and third stop positions while in the first mode. At least one of the third and fourth end positions differs from the first and second end positions. A first distance between the first and second stop positions differs from a second distance between the second and third stop positions.

11 Claims, 11 Drawing Sheets

ELECTRIC FRONT DERAILLEUR

BACKGROUND

Field of the Invention

This invention generally relates to an electric front derailleur for a bicycle. More specifically, the present invention relates to an electric front derailleur that can be used with bicycles having different speeds, including bicycles with two chain rings and bicycles with three chain rings.

Background Information

Generally, a front derailleur is mounted to the bicycle frame adjacent to the chain rings or front sprockets to shift a chain laterally between the chain rings. A front derailleur includes a base or fixed member that is non-movably secured to the bicycle frame. A front derailleur further includes a movable member or chain guide that is movably supported relative to the base member such that the movable member moves between at least two lateral shift positions to shift the chain between the chain rings.

SUMMARY

Generally, the present disclosure is directed to an electric front derailleur for use with both at least bicycles having two chain rings and bicycles having three chain rings.

In accordance with a first aspect of the present invention, an electric front derailleur is provided that basically comprises a base member, a movable member, a driving unit and a controller. An electric front derailleur basically includes a base member, a movable member and a controller. The base member includes a bicycle mounting portion. The movable member is movable with respect to the base member. The driving unit is operatively coupled to the movable member to move the movable member with respect to the base member. The controller is configured to selectively operate the driving unit with one of a first mode which moves the movable member between a first end position and a second end position and a second mode which moves the movable member between a third end position and a fourth end position. The controller is configured to operate the driving unit to selectively position the movable member at a first stop position, a second stop position and a third stop position while in the first mode. At least one of the third end position and the fourth end position differs from the first end position and the second end position. A first distance between the first and second stop positions differs from a second distance between the second and third stop positions.

In accordance with a second aspect of the present invention, the electric front derailleur according to the first aspect is configured so that the controller is configured to operate the driving unit to selectively position the movable member at a fourth stop position and a fifth stop position while in the second mode.

In accordance with a third aspect of the present invention, the electric front derailleur according to the second aspect is configured so that a third distance between the fourth and fifth stop positions differs from the first and second distances.

In accordance with a fourth aspect of the present invention, the electric front derailleur according to the first aspect is configured so that the third end position differs from the first end position and the second end position, and the fourth end position differs from the first end position and the second end position.

In accordance with a fifth aspect of the present invention, the electric front derailleur according to the first aspect is configured so that the controller includes an input interface that connects to a user operating device to switch between the first mode and the second mode.

In accordance with a sixth aspect of the present invention, the electric front derailleur according to the first aspect is configured so that the driving unit includes at least one link member movably coupling the movable member to the base member, the at least one link member being changeably configured to switch an actuation ratio between the first mode and the second mode.

In accordance with a seventh aspect of the present invention, the electric front derailleur according to the first aspect is configured so that the driving unit has a first actuation ratio that varies as the movable member moves between the first end position and the second end position while in the first mode, and so that the driving unit has a second actuation ratio that varies differently from the first actuation ratio as the movable member moves between the third end position and the fourth end position while in the second mode.

In accordance with an eighth aspect of the present invention, the electric front derailleur according to the seventh aspect is configured so that the driving unit includes a connecting structure and an electric motor, the connecting structure being driven by the electric motor to move the movable member relative to the base member.

In accordance with a ninth aspect of the present invention, the electric front derailleur according to the eighth aspect is configured so that the connecting structure includes a driving link rotated by the electric motor, a driven link attached to the movable member and a connecting link connected between the driving link and the driven link at least one of the driving link, the driven link and the connecting link being changeable from a first configuration to a second configuration.

In accordance with a tenth aspect of the present invention, the electric front derailleur according to the ninth aspect is configured so that at least one of the driving link, the driven link and the connecting link being changeable from a first configuration to a second configuration.

In accordance with an eleventh aspect of the present invention, the electric front derailleur according to the first aspect is configured so that the first end position is closer to the base member than the second and third end positions.

In accordance with a twelfth aspect of the present invention, the electric front derailleur according to the eleventh aspect is configured so that the third end position is closer to the base member than the second and fourth end positions.

In accordance with a thirteenth aspect of the present invention, the electric front derailleur according to the twelfth aspect is configured so that the fourth end position is closer to the base member than the second end position.

Other objects, features, aspects and advantages of the disclosed electric front derailleur will become apparent to those skilled in the art from the following detailed description, which, taken in conjunction with the annexed drawings, discloses preferred embodiments of the electric front derailleur.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
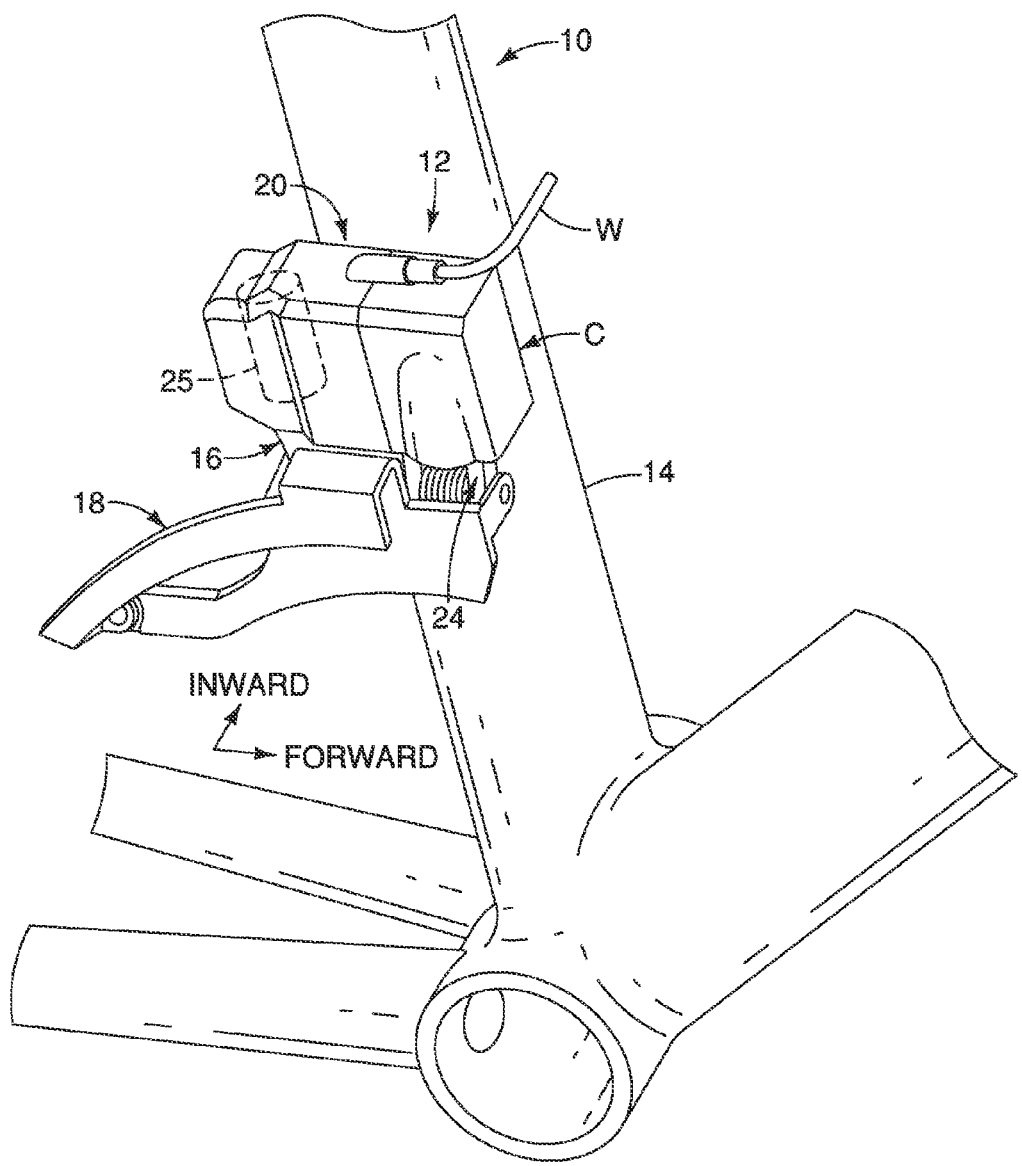
FIG. 1 is a partial side perspective view of a bicycle frame that is equipped with an electric front derailleur in accordance with one embodiment.
Figure 2:
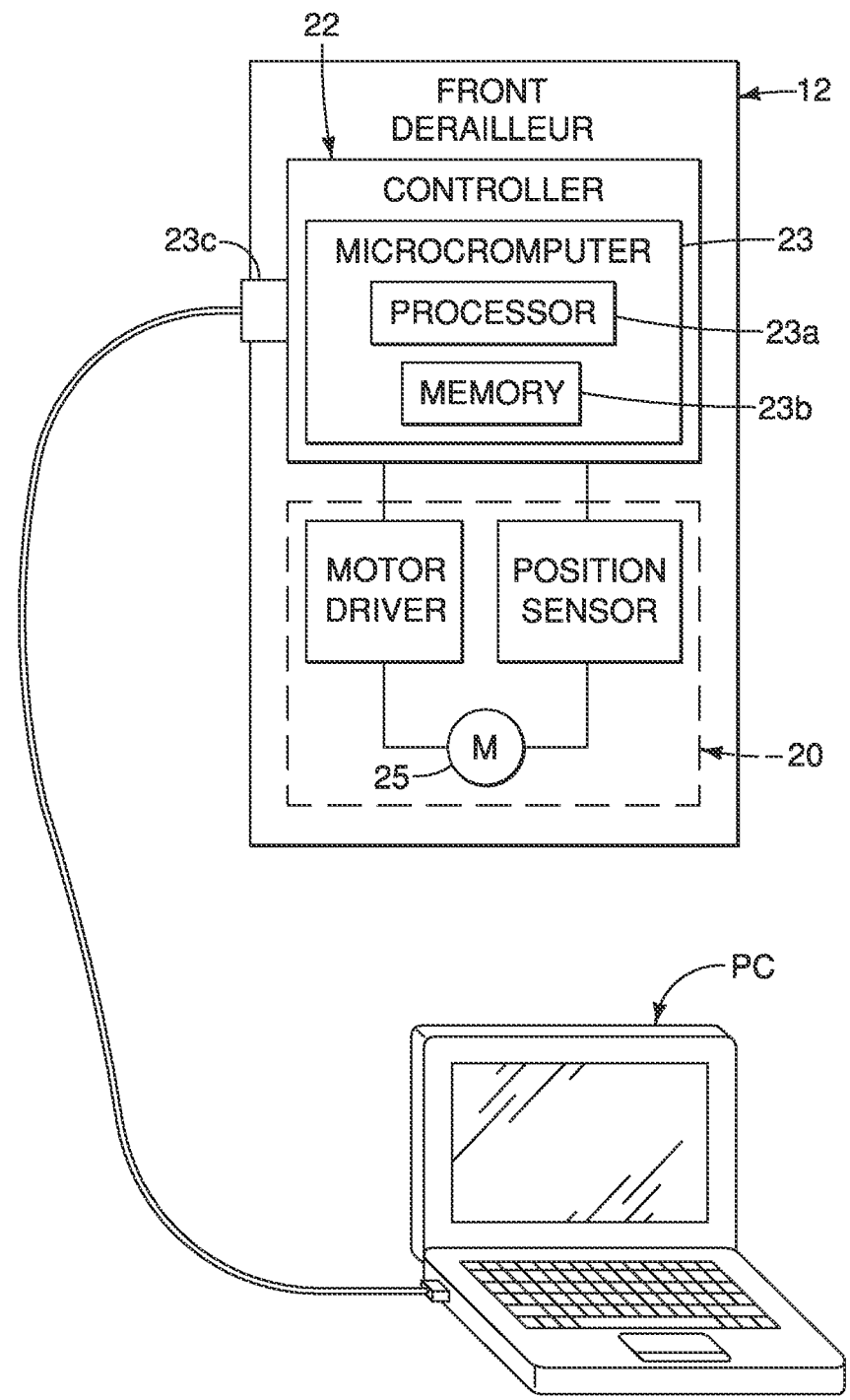
FIG. 2 is a simplified schematic block diagram showing an exemplary configuration of the electric front derailleur illustrated in FIG. 1 in which the electric front derailleur is connected to a personal computer (PC)

Referring initially to FIGS. 1 and 2, a portion of a bicycle frame 10 is illustrated with an electric front derailleur 12 in accordance with one illustrated embodiment. In the illustrated embodiment, the electric front derailleur 12 (hereinafter the derailleur 12) is mounted to a seat tube 14 of the bicycle frame 10. However, the derailleur 12 can be mounted to the bicycle frame 10 in other ways. The derailleur 12 basically includes a base member 16, a movable member 118, an electric driving unit 20 and a controller 22. As explained below, the controller 22 is configured to selectively operate the driving unit 20 with one of a first mode and a second mode. In the illustrated embodiments, the first mode of operation corresponds to the derailleur 12 being used with a three-speed configuration (i.e., a bicycle having only three chain rings or front sprockets), and the second mode of operation corresponds to the derailleur 12 being used with a two-speed configuration (i.e., a bicycle having only two chain rings or front sprockets).

As seen in FIG. 2, the controller 22 includes a microcomputer 23 having a processor 23a and memory 23b. The controller 22 also includes a shift control program that controls the movement of the movable member 18 as discussed below. The shift control program can be stored in the memory 23b, which includes a ROM (Read Only Memory) device and a RAM (Random Access Memory) device. The controller 22 includes an input interface 23c such as a USB port that connects to a user operating device such as a shifter (not shown) and/or a cycle computer (not shown) for receiving shift signals and or setting signals. As seen in FIG. 2, a personal computer PC can be connected to the input interface 23c to update and/or change the programming of the controller 22 such as setting distances between stop positions and end positions as discussed below. The programming of the controller 22 can also be changed with a cycle computer (not shown). In any case, the input interface 23c connects to a user operating device (e.g., a shifter, a cycle computer, a personal computer, etc.) to switch between the first mode of operation and the second mode of operation.

Figure 3:
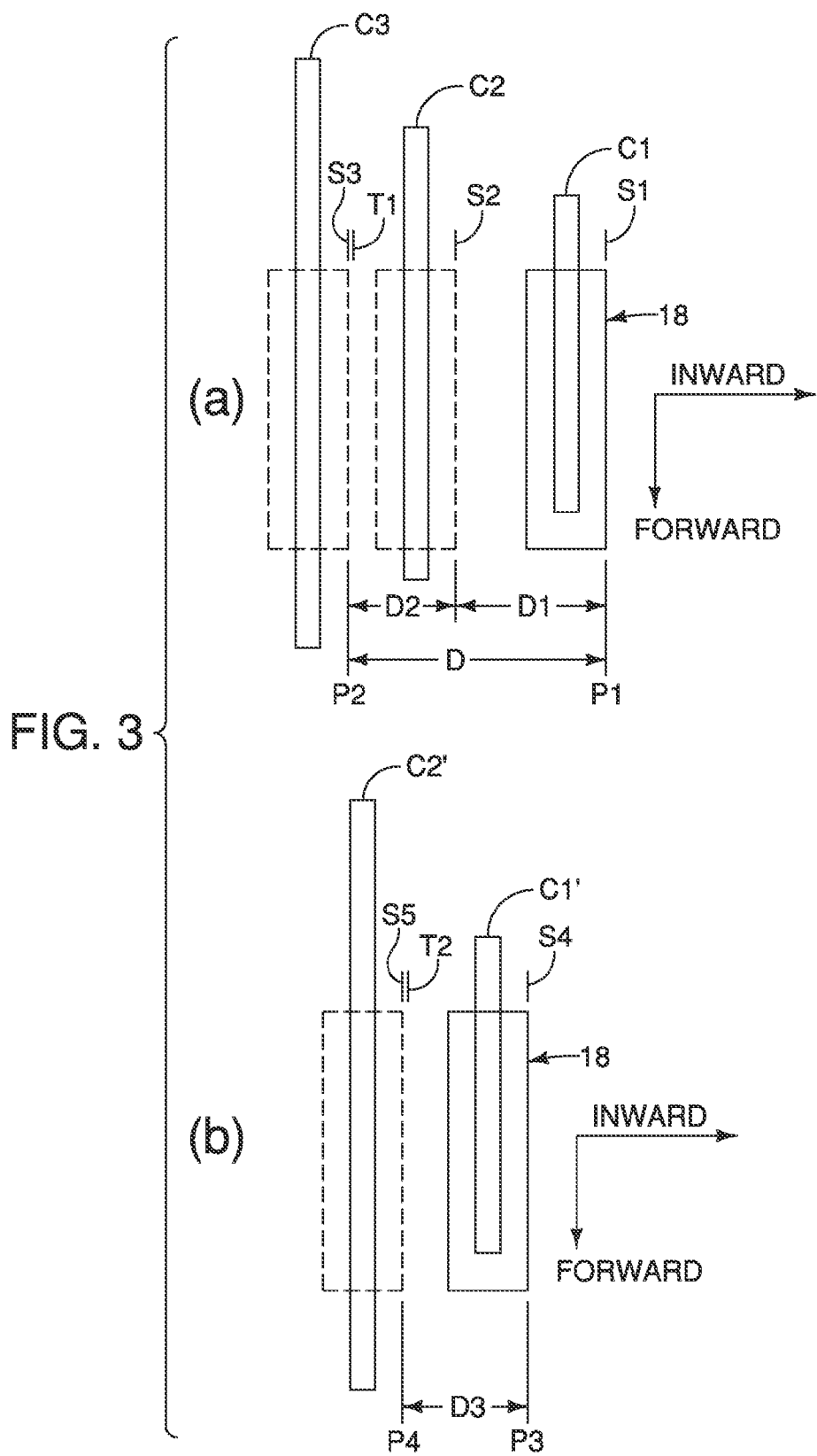
FIG. 3 is a pair of simplified schematic diagrams showing (a) the chain guide of the electric front derailleur being moved between three stop positions while in a first mode for a front three-speed configuration having first and second end positions corresponding to first and third stop positions, respectively, and (b) the chain guide of the electric front derailleur being moved between two stop positions while in a second mode for a front two-speed configuration having third and fourth end positions corresponding to fourth and fifth stop positions, respectively.
Figure 4:
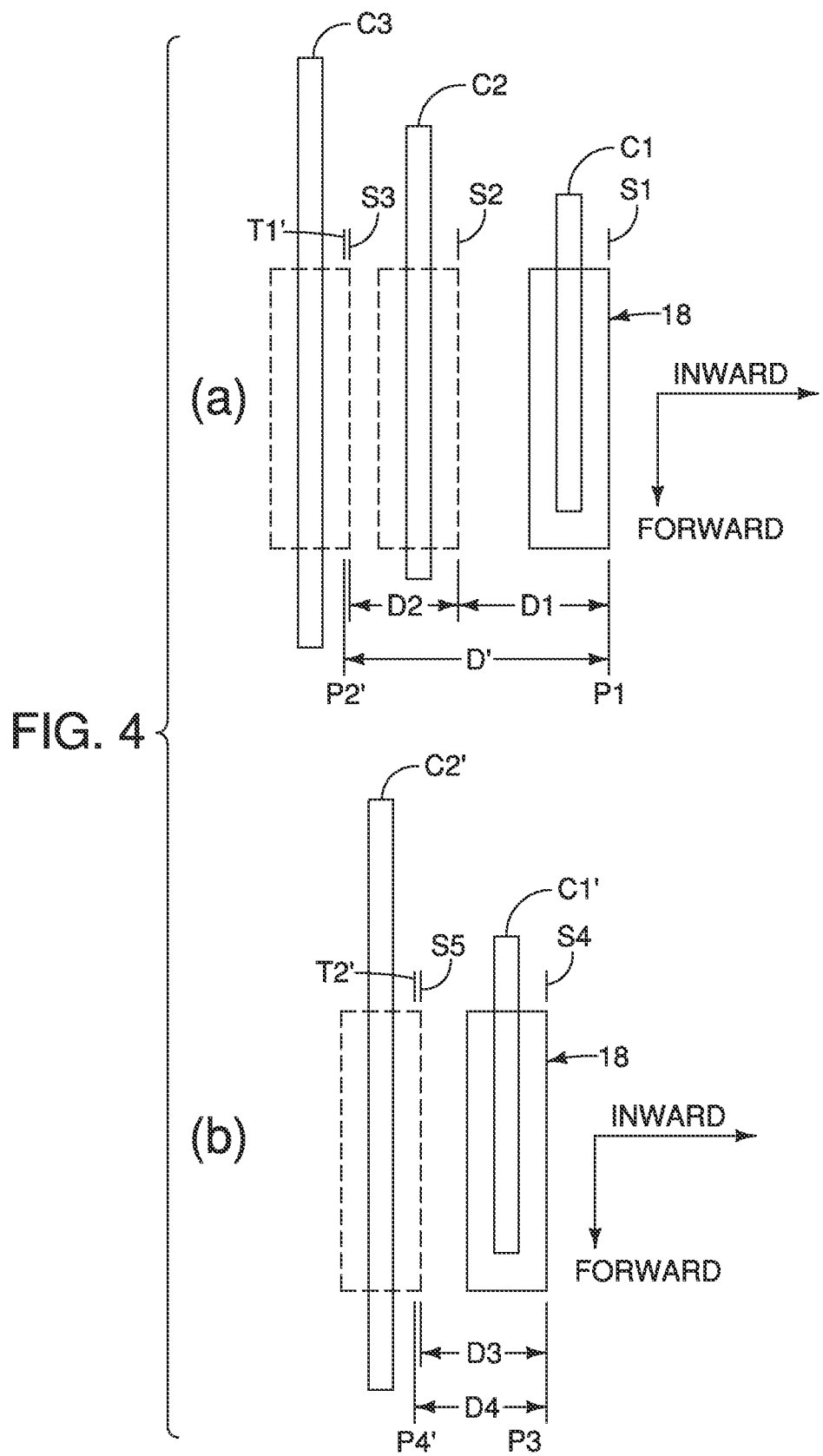
FIG. 4 is a pair of simplified schematic diagrams showing (a) the chain guide of the electric front derailleur being moved between three stop positions while in a first mode for a front three-speed configuration having first and second end positions corresponding to a first stop position and an outer trim position, respectively, and (b) the chain guide of the electric front derailleur being moved between two stop position while in a second mode for a front two-speed configuration having third and fourth end positions corresponding to a fourth stop position and an outer trim position, respectively.

Referring to FIGS. 2 to 4, the controller 22 is selectively set by a user to operate the driving unit 20 either in the first mode or the second mode. As seen in the diagrams (a) of FIGS. 3 and 4, the controller 22 operates the driving unit 20 in the first mode for a drive train having only three chain rings C1, C2 and C3, while in the diagrams (b) of FIGS. 3 and 4, the controller 22 operates the driving unit 20 in the second mode for a drive train having only two chain rings C1' and C2'. Thus, the controller 22 can be selectively programmed to carry out anyone of these four operation modes by setting stop positions and end positions for the particular bicycle that the derailleur 12 will be installed on. In the illustrated embodiment, the lateral distances between the chain rings C1, C2 and C3 is not equal. As used herein, the term "stop position" refers to a preset chain cage position in which the chain cage of the movable member 18 is position over one of the chain rings C1, C2 or C3 to shift the chain 16 thereon. As used herein, the term "end position" refers to a preset outermost or innermost chain cage position in which the chain cage of the movable member 18 can move in a lateral direction.

As seen in the diagram (a) of FIG. 3, the controller 22 is configured to operate the driving unit 20 to selectively position the movable member 18 at a first stop position S1, a second stop position S2 and a third stop position S3 while in the first mode. In the first mode, the controller 22 is further configured to operate the driving unit 20 to selectively move the movable member 18 between a first end position P1 and a second end position P2 as seen in the diagram (a) of FIG. 3. Furthermore, in the first mode of the diagram (a) of FIG. 3, the controller 22 is further configured to operate the driving unit 20 to selectively move the movable member 18 to an inner trim stop position T1. In the diagram (a) of FIG. 3, the first and second end positions P1 and P2 corresponding to the first and third stop positions S1 and S3, respectively. In other words, the first end position P1 and the first stop position S1 are the same positions, and the second end position P2 and the third stop position S3 are the same positions. The first and second end positions P1 and P2 are laterally spaced apart by a total stoke distance D. The first stop position S1 is laterally spaced from the second stop position S2 by a first distance D1. The second stop position S2 is laterally spaced from the third stop position S3 by a second distance D2.

As seen in the diagram (b) of FIG. 3, the controller 22 is configured to operate the driving unit 20 to selectively position the movable member 18 at a fourth stop position S4 and a fifth stop position S5 while in the second mode. The fourth stop position S4 is laterally spaced from the fifth stop position S5 by a third distance D3. Furthermore, in the second mode of the diagram (b) of FIG. 3, the controller 22 is further configured to operate the driving unit 20 to selectively move the movable member 18 to an inner trim stop position T2. In the second mode of the diagram (b) of FIG. 3, the controller 22 is further configured to operate the driving unit 20 to selectively move the movable member 18 between a third end position P3 and a fourth end position P4. In the diagram (b) of FIG. 3, the third and fourth end positions P3 and P4 corresponding to the fourth and fifth stop positions S4 and S5, respectively. In other words, the third end position P3 and the fourth stop position S4 are the same positions, and the fourth end position P4 and the fifth stop position S5 are the same positions.

In the illustrated embodiment of FIG. 3, the third end position P3 differs from the first end position P1 and the second end position P2, and the fourth end position P4 differs from the first end position P1 and the second end position P2. Of course, the controller 22 can be configured to operate the driving unit 20 so that at least one of the third end position P3 and the fourth end position P4 differs from the first end position P1 and the second end position P2. Also in the illustrated embodiment of FIG. 3, the first distance D1 between the first and second stop positions S1 and S2 differs from the second distance D2 between the second and third stop positions S2 and S3. The third distance D3 between the fourth and fifth stop positions S4 and S5 differs from the first and second distances D1 and D2.

Moreover, referring to FIGS. 1 and 3, the first end position P1 is closer to the base member 16 than the second and third end positions P2 and P3. The third end position P3 is closer to the base member 16 than the second and fourth end positions P2 and P4. The fourth end position P4 is closer to the base member 16 than the second end position P2. The third end position P3 differs from the first end position P1 and the second end position P2, and the fourth end position P4 differs from the first end position P1 and the second end position P2.

Turning to FIG. 4, similar to the settings in FIG. 3, the controller 22 is configured to operate the driving unit 20 to selectively position the movable member 18 at the first, second and third stop positions S1, S2 and S3 while in the first mode and to selectively position the movable member 18 at the fourth and fifth stop positions S4 and S5 while in the second mode. Also the first end position P1 and the third end position P3 are the same as for the settings of the controller 22 in FIG. 3. However, on the other hand, an outer trim stop position T1' is provided while in the first mode and an outer trim stop position T2' is provided while in the second mode. Thus, in the first mode of the diagram (a) of FIG. 4, the first end position P1 and the first stop position S1 are the same positions, but a second end position P2' is provided that is different from the third stop position S3. Also in the second mode of the diagram (b) of FIG. 4, the third end position P3 and the fourth stop position S4 are the same positions, but a fourth end position P4' is provided that is different from the fifth stop position. An inner trim position and an outer trim position can be set with respect to the first stop position S1 and the fourth stop position S4, respectively. In this case, the first end position R1 and the third end position P3 are the inner trim position.

Figure 5:
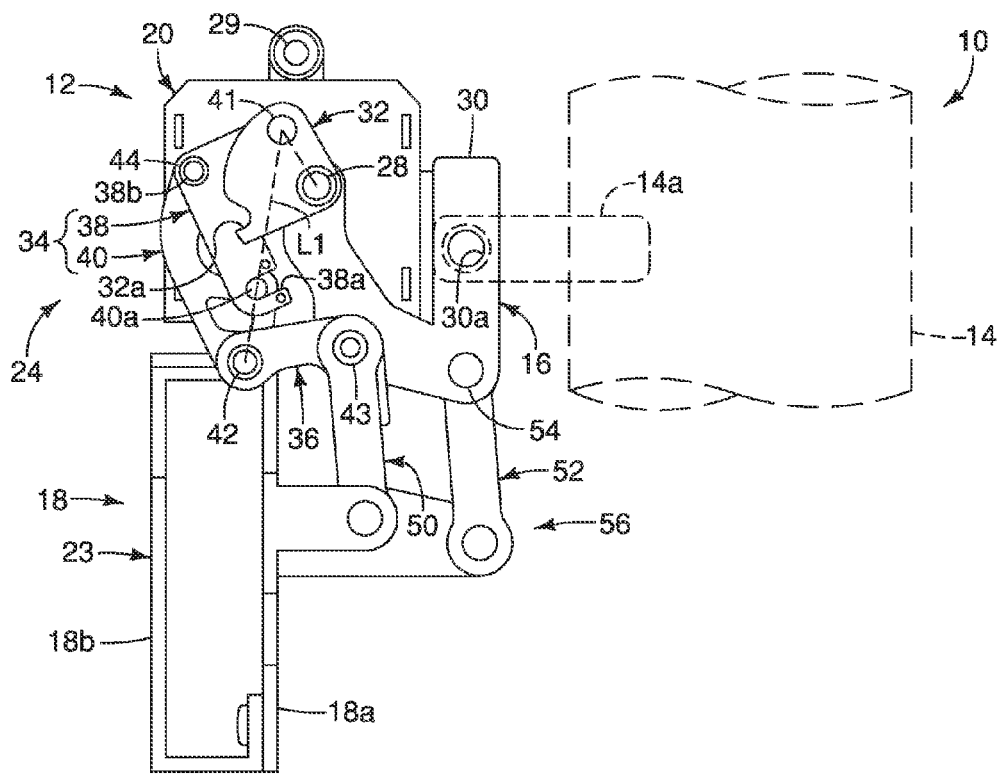
FIG. 5 is a front elevational view of the electric front derailleur illustrated in FIG. 1 with the cover of the housing of the electric driving unit removed to illustrate a first (three-speed) configuration using a first connecting structure.

Referring now to FIG. 5, one illustrative embodiment of the electric driving unit 20 is shown for carrying out the movements shown in FIGS. 3 and 4. The electric driving unit 20 is operatively coupled to the movable member 18 to move the movable member 18 with respect to the base member 16. In particular, the electric driving unit 20 includes a connecting structure 24 and a reversible electric motor 25 (FIG. 1). The connecting structure 24 interconnects the base member 16 and the chain guide 18 together. The connecting structure 24 is driven by the electric motor 25 to move the movable member 18 relative to the base member 16. The present invention can be used with other connecting structures as needed and/or desired. In the illustrated embodiments, the movable member 18 is a chain guide. Thus, hereinafter the movable member 18 will be referred to as the "chain guide 18".

Figure 6:
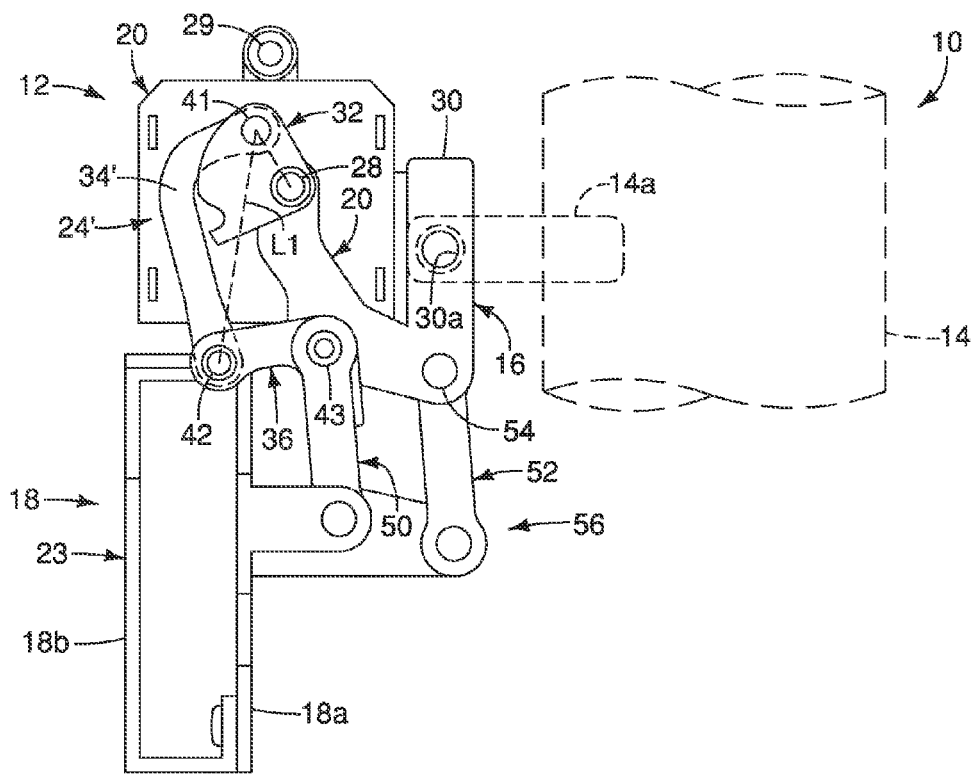
FIG. 6 is a front elevational view of the electric front derailleur illustrated in FIG. 1 with the cover of the housing of the electric driving unit removed to illustrate a second (two-speed) configuration using a second connecting structure.
Figure 17:
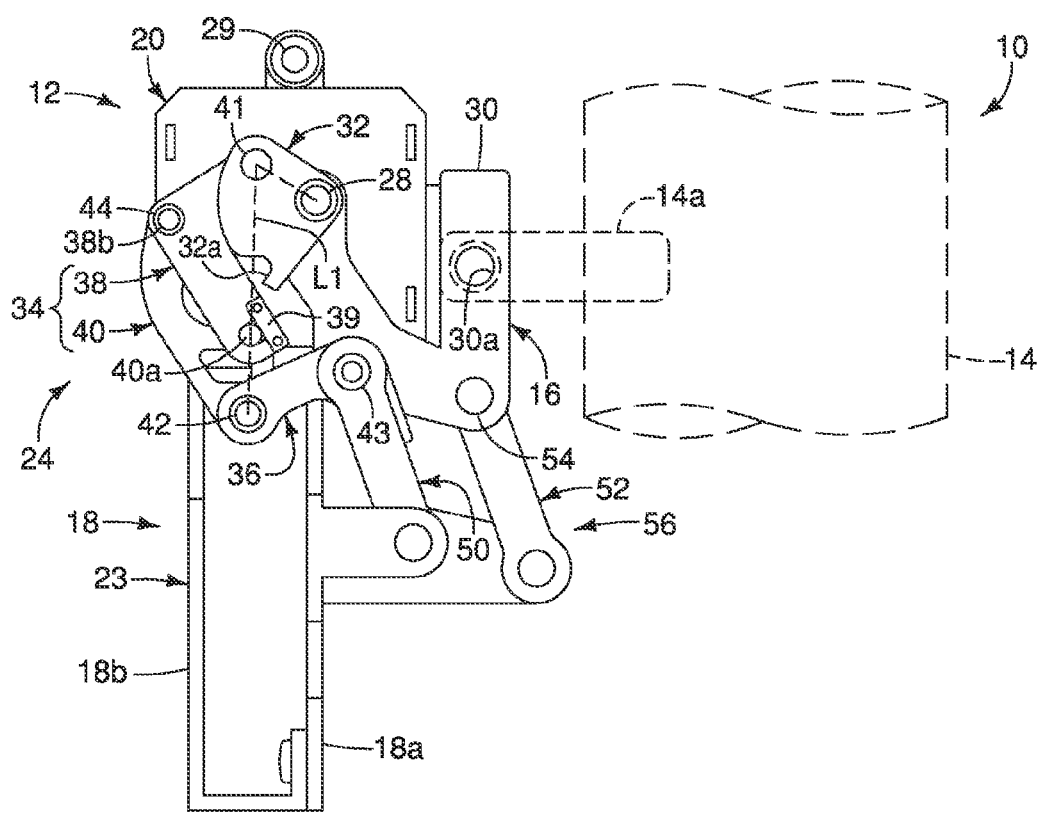
FIG. 17 is a front elevational view of the electric front derailleur illustrated in FIGS. 1 and 5 but with a locking plate fixed to the first connecting structure to convert the electric front derailleur from the three-speed configuration to the two-speed configuration.

In FIG. 1, the connecting structure 24 is partially concealed by a cover C. The cover C is secured to the housing of the electric driving unit 20 by a plurality of snap-fitted connections or by other suitable fasteners such as screws. The cover C has been removed from FIGS. 5, 7, 9, 11 and 13 to better illustrate the connecting structure 24. The controller 22 operates the motor 25 to move the chain guide 18 laterally to each of the stop positions and/or the end positions depending on the selected mode of operation. Alternatively, the connecting structure 24 can be modified as seen in FIG. 6 to form a modified connecting structure 24' as explained below. Also, the connecting structure 24 can be provided with an optional locking bar or latch 38a as seen in FIG. 17 and as explained below.

The electric driving unit 20 is operatively connected to the connecting structure 24 such that the electric driving unit 20 drives the connecting structure 24 so as to move the chain guide 18 relative to the base member 16. In particular, as seen in FIG. 5, the electric driving unit 20 has an output shaft 28 that constitutes an input member, which is connected to the connecting structure 24 such that the electric driving unit 20 drives the connecting structure 24 to move the chain guide 18 relative to the base member 16. An electrical cord W (FIG. 1) of the motor 25 is connected to a battery (not shown) and/or a generator (not shown). Preferably, a gear reduction unit (not shown) is provided between the motor 25 and the output shaft 28. Since gear reduction units are commonly used in electric derailleurs, the gear reduction unit of the electric driving unit 20 will not be discussed and/or illustrated herein.

As seen in FIGS. 5 and 6, the base member 16 includes a bicycle mounting portion 30. The bicycle mounting portion 30 has a threaded hole 30a that receives a mounting bolt (not shown) for attaching the derailleur 12 to the seat tube 14 by a braze-on hanger 14a in a conventional manner. Of course, other types of mounting arrangements, e.g. a band type, can be used as needed and/or desired. The base member 16 constitutes a fixed member, since the base member 16 is fixed relative to the seat tube 14.

Figure 7:
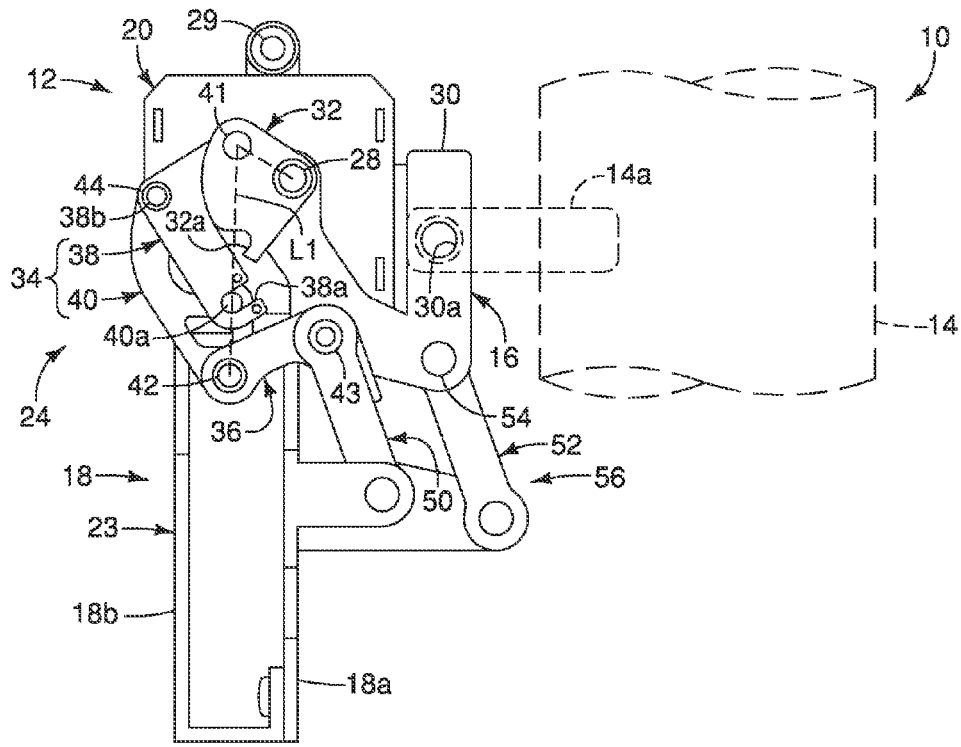
FIG. 7 is a front elevational view of the electric front derailleur illustrated in FIG. 5 (three-speed configuration) with the movable member in the low position (i.e., the fully retracted position)
Figure 9:
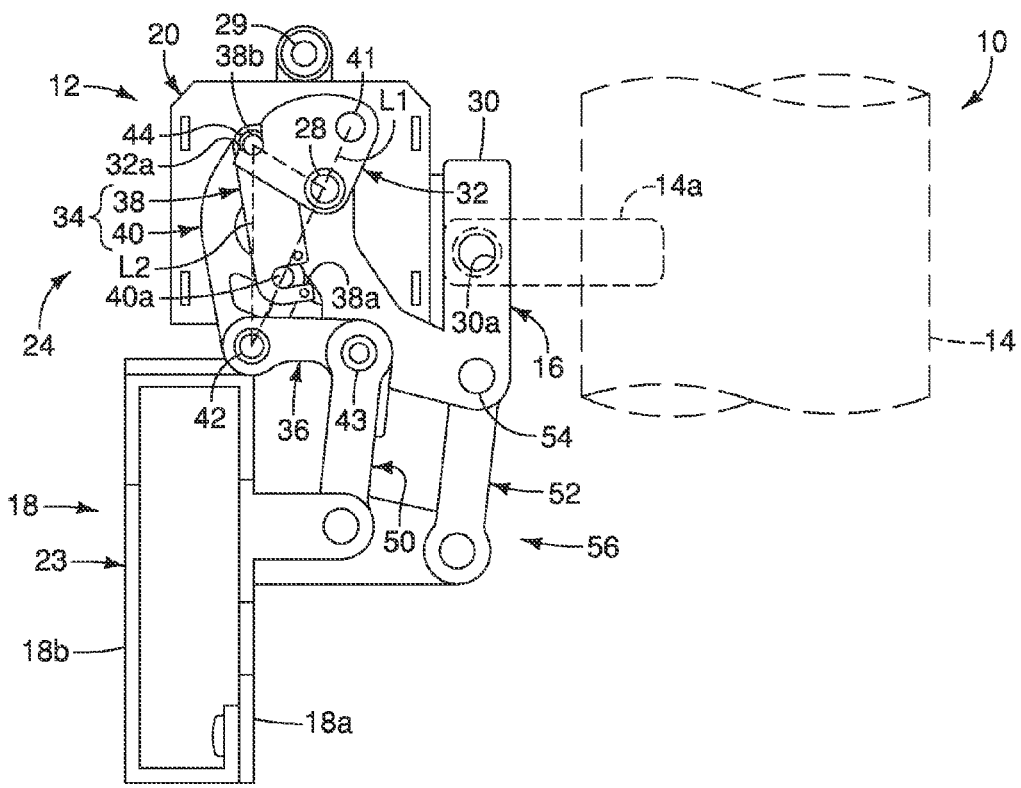
FIG. 9 is a front elevational view of the electric front derailleur illustrated in FIG. 5 (three-speed configuration) with the movable member in the middle position.
Figure 11:
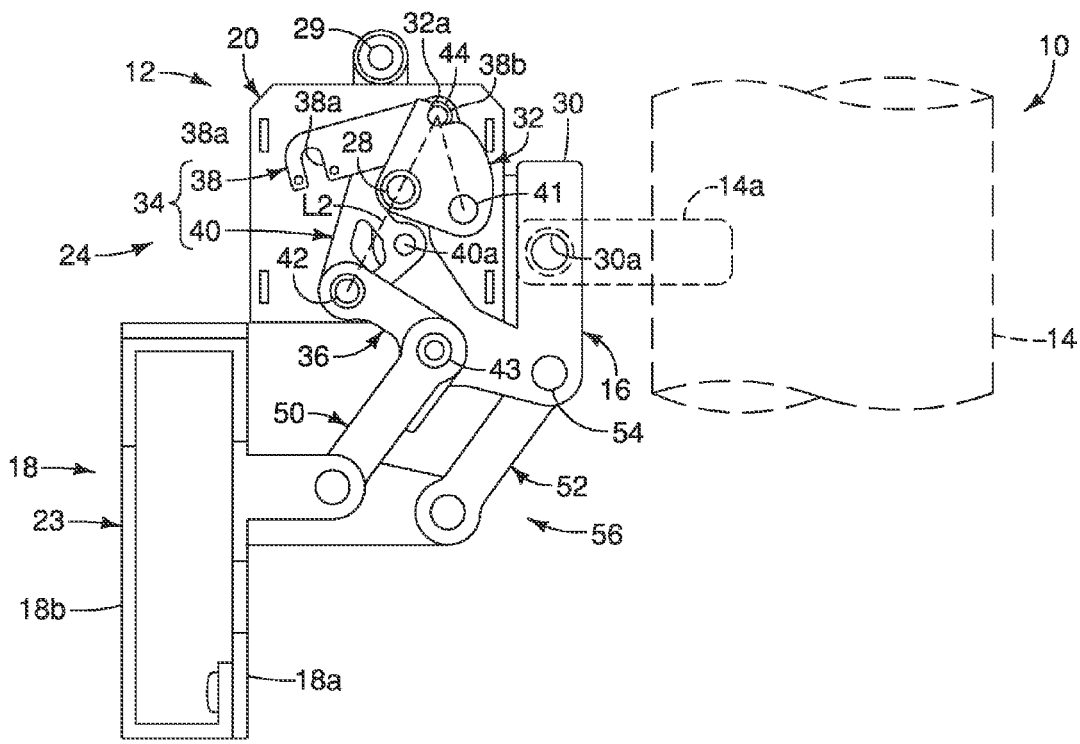
FIG. 11 is a front elevational view of the electric front derailleur illustrated in FIG. 5 (three-speed configuration) with the movable member in the top position (i.e., the fully extended position)

As seen in FIGS. 7, 9 and 11, the chain guide 18 is movable with respect to the base member 16 between the first end position P1 as seen in FIG. 7 and the second end position P2 as seen in FIG. 11. The second end position P2 of the chain guide 18 is farther than the first end position P1 of the chain guide 18 from the base member 16 in a lateral direction with respect to a vertical center longitudinal plane of the bicycle 10. In the illustrated embodiment, the first end position P1 of the chain guide 18 corresponds to a low position (i.e., the fully retracted position) of the derailleur 12. On the other hand, in the illustrated embodiment, the second end position P2 of the chain guide 18 corresponds to a top position (i.e., the fully extended position) of the derailleur 12. The derailleur 12 is designed to be used with a bicycle that has three chain rings. Thus, the chain guide 18 is movable with respect to the base member 16 to an intermediate or middle position between the first and second end positions P1 and P2 as seen in FIG. 7.

The chain guide 118 includes an inner plate 18a and an outer plate 18b. The inner plate 18a and the outer plate 18b are laterally spaced apart and connected to each other at upper and lower end portions to define a chain cage 23. The chain cage 23 of the chain guide 18 defines a chain receiving slot therein. The inner plate 18a pushes a chain up onto a larger chain rings during an upshift operation. The outer plate 18b pulls a chain inward onto a smaller chain rings during a downshift operation.

As mentioned above, the connecting structure 24 movably connects the chain guide 18 to the base member 16 between the first and second end positions P1 and P2. Every derailleur has an "actuation ratio" or "shift ratio" which refers to the ratio between a movement amount of an actuation element, e.g. a cable or a shaft of a motor and a lateral travel amount of the movable member. Since the connecting structure 24 provides for a variable actuation ratio that is particularly, suitable for the first mode (e.g. the three-speed configuration), it is preferable that the actuation ratio be changed for the second mode (e.g. the two-speed configuration).

In one embodiment, the driving unit 20 includes at least one link member movably coupling the movable member 18 to the base member 16, wherein the at least one link member is changeably configured to switch an actuation ratio between the first mode and the second mode. Here, the connecting structure 24 basically includes a driving link 32, a connecting link 34 and a driven link 36. At least one of the driving link 32, the driven link 36 and the connecting link 34 is changeable from a first configuration to a second configuration. Switching of the actuation ratio between the first mode and the second mode can be easily accomplished by replacing two piece construction of the connecting link 34 as seen in FIG. 5 with a one-piece connecting link 34' as seen in FIG. 6. Of course, it will be apparent from this disclosure that the driving unit 20 can be modified in other ways to change the actuation ratio of the derailleur 12 for use with the second mode (e.g. the two-speed configuration). For example, the latch 39 can be used to lock the first and second arm 38 and 40 together as seen in FIG. 17. In any case, the derailleur 12 is either sold with both the connecting link 34 and the connecting link 34' as a kit so that the user can switch between the first and second configurations, or the connecting link 34' can be sold separately so that the derailleur 12 can be converted to a two-speed configuration.

Figure 8:
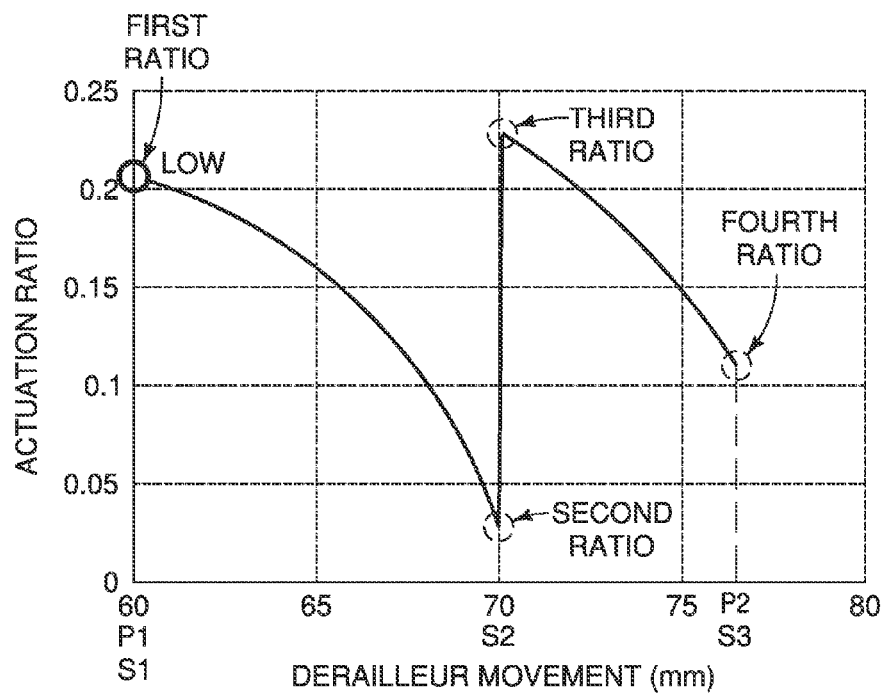
FIG. 8 is a graph plotting the actuation ratio with respect to the lateral movement of the movable member of the electric front derailleur illustrated in FIG. 5 (three-speed configuration), wherein the movable member is in the low position.
Figure 10:
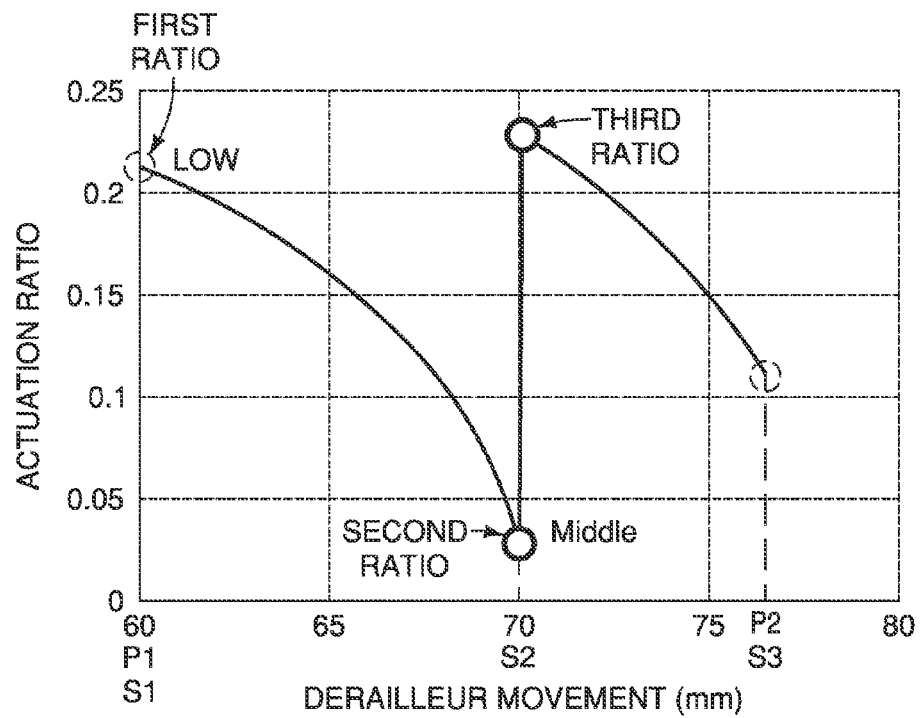
FIG. 10 is a graph plotting the actuation ratio with respect to the lateral movement of the movable member of the electric front derailleur illustrated in FIG. 5 (three-speed configuration), wherein the movable member is in the middle position.
Figure 12:
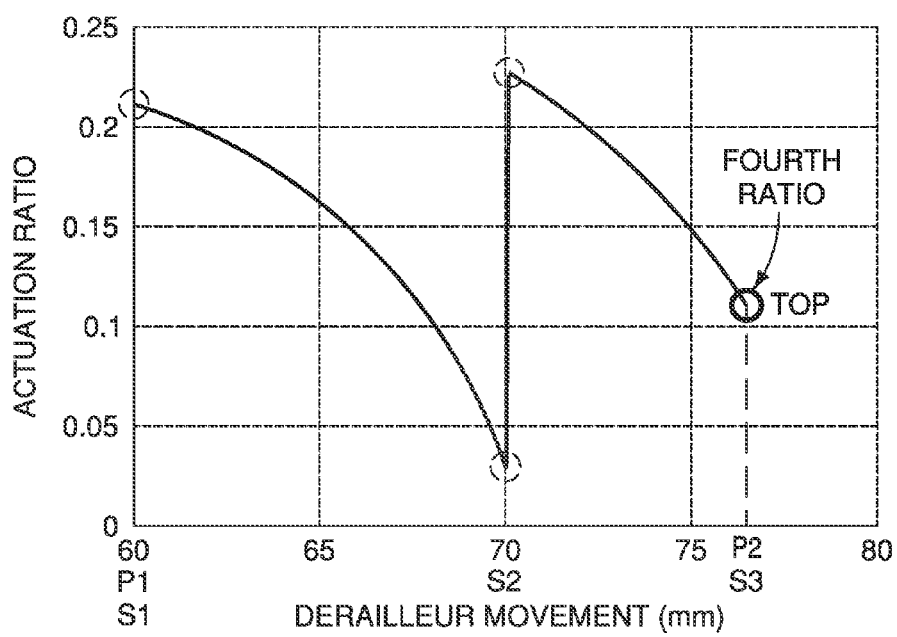
FIG. 12 is a graph plotting the actuation ratio with respect to the lateral movement of the movable member of the electric front derailleur illustrated in FIG. 5 (three-speed configuration), wherein the movable member is in the top position.
Figure 14:
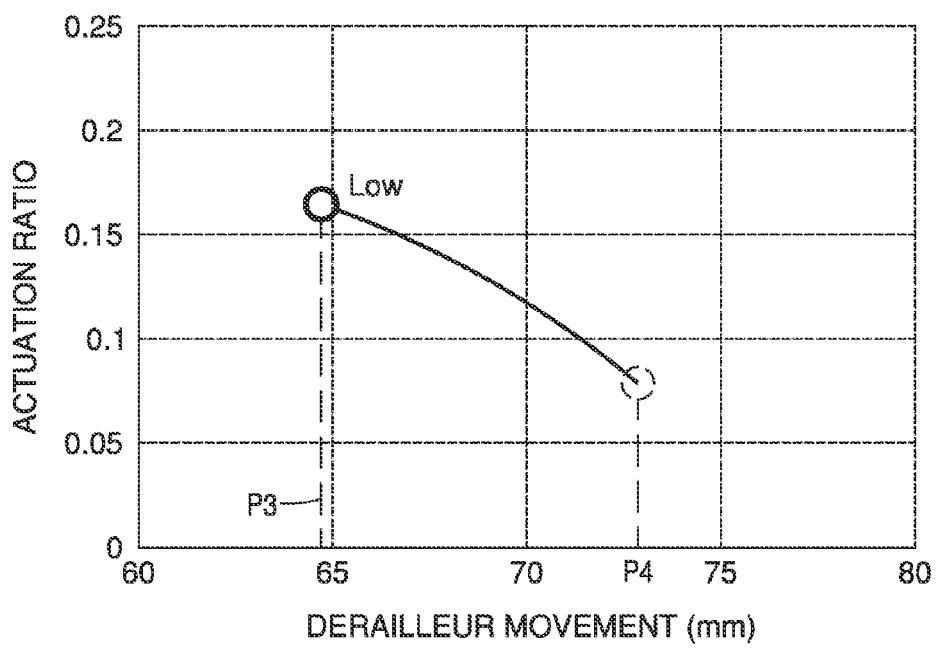
FIG. 14 is a graph plotting the actuation ratio with respect to the lateral movement of the movable member of the electric front derailleur illustrated in FIG. 6 (two-speed configuration), wherein the movable member is in the low position.
Figure 16:
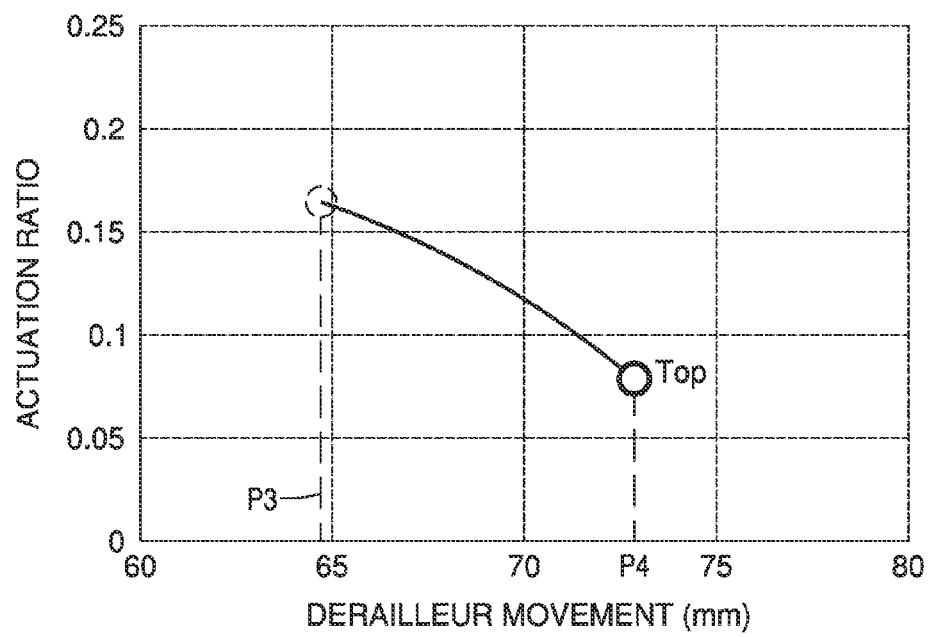
FIG. 16 is a graph plotting the actuation ratio with respect to the lateral movement of the movable member of the electric front derailleur illustrated in FIG. 6 (two-speed configuration), wherein the movable member is in the top position.

The driving link 32 is rotated by the electric motor 25. The connecting link 34 is connected between the driving link 32 and the driven link 36. The driven link 36 is attached to the movable member 18. The driving unit 20 has a first actuation ratio that varies as the movable member 18 moves between the first end position P1 and the second end position P2 while in the first mode as seen in FIGS. 8, 10 and 12. With the connecting link 34' or the latch 39 installed in the driving unit 20, the driving unit 20 has a second actuation ratio that varies differently from the first actuation ratio, as seen in FIGS. 14 and 16, as the movable member 18 moves between the third end position P3 and the fourth end position P4 while in the second mode.

The driving link 32 is fixedly mounted to the output shaft 28 (i.e., the input member) such that the driving link 32 rotates together with the output shaft 28. Thus, the driving link 32 is rotatably arranged on the base member 16 by the output shaft 28. The driven link 36 is operatively coupled to the chain guide 18.

Preferably, the connecting link 34 includes a first arm 38 and a second arm 40. The first arm 38 includes a first slot 38a. The second arm 40 includes a first switching pin 40a that selectively engages the first slot 38a as the chain guide 18 moves between the first and second end positions P1 and P2. The first arm 38 includes a second switching pin 38b that selectively engages a second slot 32a of the driving link 32 as the chain guide 18 moves between the first and second end positions P1 and P2. As discussed below, this arrangement of the switching pins 38b and 40a and the slot 32a and 38a provides for an actuation ratio that descends and then ascends as the chain guide 18 moves from the first end position P1 towards the second end position P2.

The connecting link 34 is pivotally connected to the driving link 32 by a pivot shaft 41, and is further pivotally connected to the driven link 36 by a pivot shaft 42. More specifically, the first arm 38 is pivotally connected to the driving link 32 by the pivot shaft 41, and the second arm 40 is pivotally connected to the driven link 36 by the pivot shaft 42. The driven link 36 is pivotally connected to the base member 16 by a third pivot shaft 43. The first arm 38 and the second arm 40 are pivotally connected to each other by a fourth pivot shaft 44. The second switching pin 38b is disposed along the pivot axis defined by the fourth pivot shaft 44. In particular, the switching pin 38b is an extension of the fourth pivot shaft 44.

In the illustrated embodiment, the connecting structure 24 further includes a first support link 50 and a second support link 52. The first support link 50 has a first end pivotally attached to the base member 16 and a second end pivotally mounted to the chain guide 18. The second support link 52 has a third end pivotally attached to the base member 16 and a fourth end pivotally mounted to the chain guide 18. As seen in FIG. 5, according to this connection of the first and second support links 50 and 52, the base member 16 and the chain guide 18, a four-bar linkage 56 is defined. The driven link 36 is fixedly coupled to the first support link 50. However, the driven link 36 can be coupled to the second support link 52. Thus, the driven link 36 is coupled to one of the first and second support links 50 and 52. Since the first support link 50 is closer to the chain guide 18 than the second support link 52, the first support link 50 is more preferably fixedly coupled with the driven link 36. The first support link 50 is pivotally connected to the base member 16 by the third pivot shaft 43. The second support link 52 is pivotally connected to the base member 16 by a pivot shaft 54.

Basically, as seen in FIGS. 7 and 9, the connecting link 34 has a first effective length L1 as the chain guide 18 moves from the first end position P1 or the first stop position S1 toward the second stop position S2. As seen in FIG. 11, the connecting link 34 has a second effective length L2 as the chain guide 18 moves from the second stop portion S2 toward the second end position P2 or the third stop position S3. In FIGS. 8, 10 and 12, the case that the first end position P1 is same as the first stop position S1 and the second end position P2 is same as the third stop position S3 is disclosed. The first effective length L1 of the connecting link 34 is greater than the second effective length L2 of the connecting link 34.

More specifically, the first switching pin 40a is engaged with the first slot 38a to form a first output arm as the chain guide 18 moves from the first end position P1 toward the intermediate position. The first output arm extends from the center of the first pivot shaft 41 to the center of the second pivot shaft 42, and has the first effective length L1. The first switching pin 40a is disposed closer to the second pivot shaft 42 than the fourth pivot shaft 44. The second switching pin 38b is engaged with the second slot 32a to form a second output arm as the chain guide 18 moves from the second stop position S2 toward the second end position P2. The second output arm extends from the center of the fourth pivot shaft 44 to the center of the second pivot shaft 42, and has the second effective length L2.

As seen in the graphs of FIGS. 8, 10 and 12, with this arrangement of the connecting structure 24, the connecting structure 24 moves the chain guide 18 with an actuation ratio that descends and then ascends as the chain guide 18 moves from the first end position P1 (i.e., the fully retracted position) towards the second end position P2 (i.e., the fully extended position). As illustrated in FIG. 8, the actuation ratio changes in order of a first ratio, a second ratio being smaller than the first ratio, and a third ratio being greater than the second ratio, as the chain guides 22 moves from the first end position P1 (FIG. 8) towards the second end position P2 (FIG. 12). In this way, the actuation ratio descends from the first ratio to the second ratio as seen in FIGS. 8, 10 and 12, and then ascends from the second ratio to the third ratio as seen in FIG. 10. The actuation ratio is switched from the second ratio to the third ratio at the second stop position S2 (e.g., the "MIDDLE" position) between the first end position P1 (e.g., the "LOW" position) and the second end position P2 (e.g., the "TOP" position) when the first switching pin 40a is disengaging from the first slot 38a and the second switching pin 38b is engaging with the second slot 32a. Lastly, as seen in FIGS. 10 and 12, the actuation ratio descends from the third to a fourth ratio that is smaller than the third ratio as the chain guide 18 moves from the first end position P1 towards the second end position P2. In the illustrated embodiment, the first and third ratios are more than twice the second ratio, and the first and third ratios are more than twice the fourth ratio.

In performing a chain shifting operation, the motor 25 is operated by a user operating device (not shown) to turn the output shaft 28 of the electric driving unit 20. Depending on the rotational direction of the output shaft 28, the connecting structure 24 will either move the chain guide 18 towards or away from the base member 16 and the seat tube 14 of the bicycle 10. When the chain guide 18 is in the first end position P1 (e.g., the fully retracted position), the output shaft 28 will rotate in a clockwise direction as seen in FIGS. 7, 9 and 11 to move the chain guide 18 towards the second end position P2. Thus, the driving link 32 will also rotate with the output shaft 28 in the clockwise direction as seen in FIGS. 7, 9 and 11. In the first end position P1, the first switching pin 40a is engaged with the first slot 38a and the second switching pin 38b is disengaged from the second slot 32a. Thus, the first and second arms 38 and 40 are connected together as a rigid unit to form the first output arm with the first effective length L1. With the first switching pin 40a is engaged with the first slot 38a, the driven link 36 and the first and second support links 50 and 52 are moved by the connecting structure 24 with the first output arm acting between the first pivot shaft 41 and the second pivot shaft 42.

However, as the output shaft 28 continues to rotate the driving link 32 in the clockwise direction, the second slot 32a of the driving link 32 will eventually hook onto the second switching pin 38b of the fourth pivot shaft 44. As the second slot 32a hooks onto the second switching pin 38b, the first switching pin 40a begins to disengage from the first slot 38a. This results in the first and second arms 38 and 40 being connected together as a rigid unit to form the second output arm with the second effective length U. In other words, the connecting structure 24 switches from the first output arm to the second output arm. With the second slot 32a engaged with the second switching pin 38b, the driven link 36 and the first and second support links 50 and 52 are moved by the connecting structure 24 with the second output arm acting between the fourth pivot shaft 44 and the second pivot shaft 42.

Figure 13:
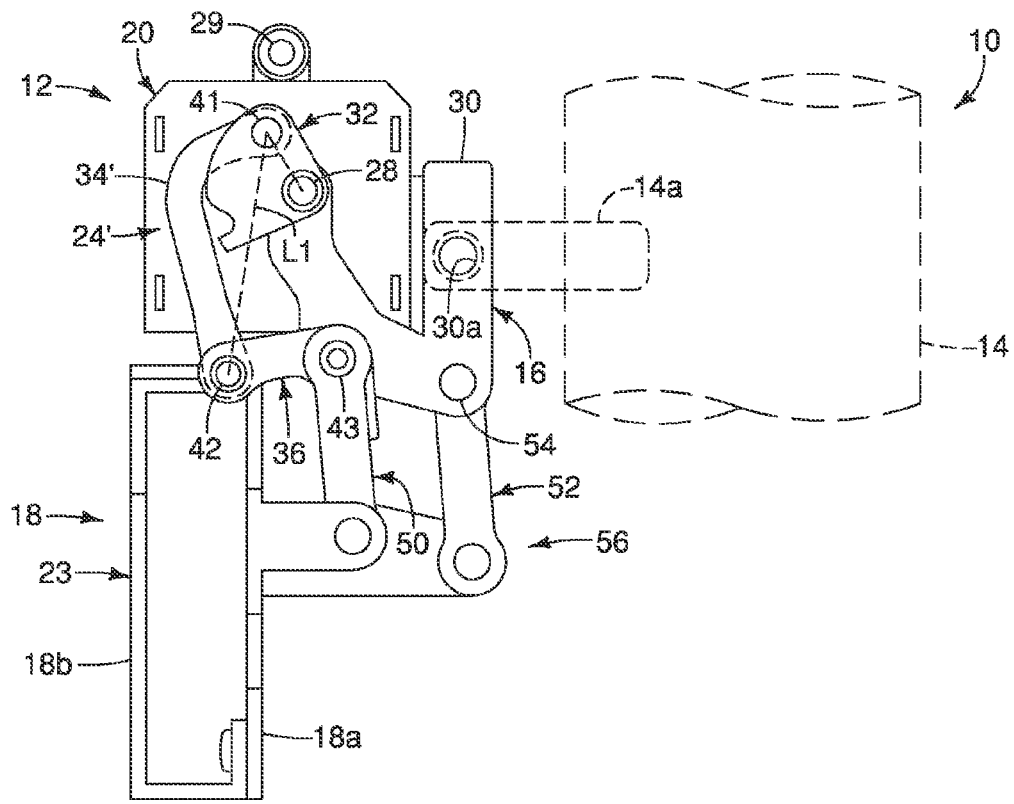
FIG. 13 is a front elevational view of the electric front derailleur illustrated in FIG. 6 (two-speed configuration) with the movable member in the low position (i.e., the fully retracted position)
Figure 15:
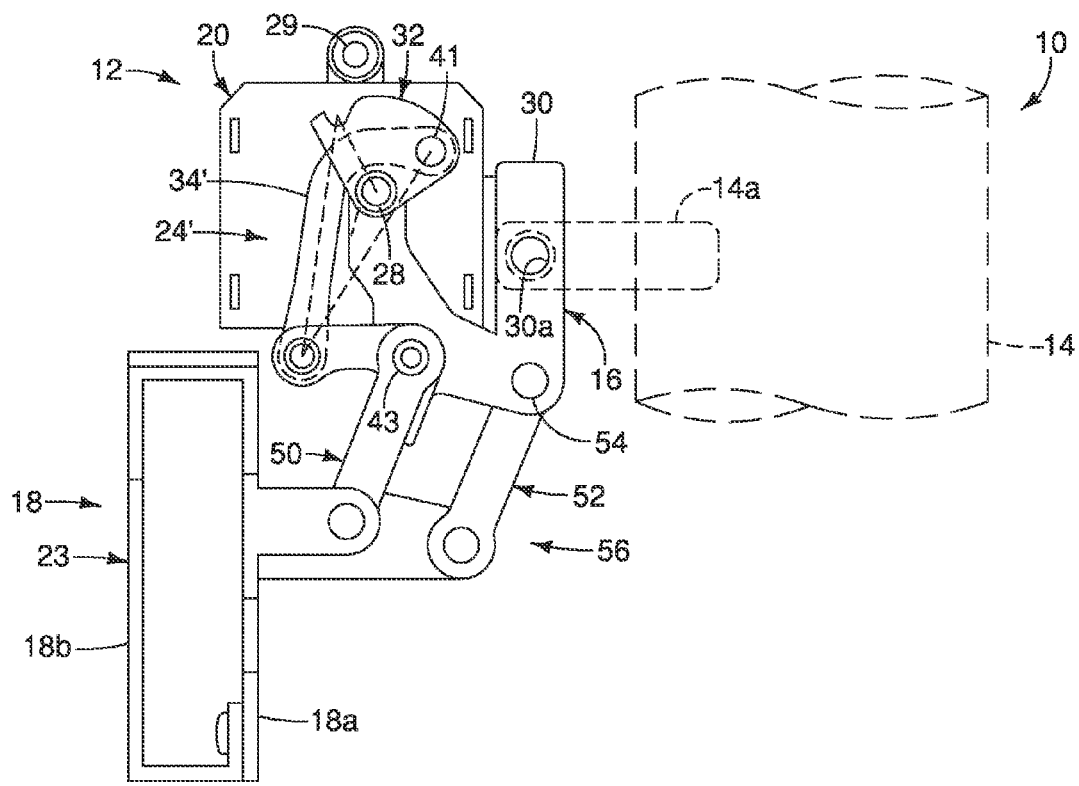
FIG. 15 is a front elevational view of the electric front derailleur illustrated in FIG. 6 (two-speed configuration) with the movable member in the top position (i.e., the fully extended position)

As seen in FIGS. 13 and 15, the derailleur 12 is illustrated with the connecting link 34' such that the derailleur 12 has the two-speed configuration with the second actuation ratio, as seen in FIGS. 14 and 16 FIG. 13 shows the chain guide 18 in the low position (i.e., the fully retracted position), while FIG. 15 shows the chain guide 18 in the top position (i.e., the fully extended position). Here, the second actuation ratio is different from the first actuation ratio for the three-speed configuration.

As seen in FIG. 17, the latch 39 is installed on the connecting link 34 to lock the first and second arm 38 and 40 together. Thus, the driving unit 20 has the second actuation ratio, as seen in FIGS. 14 and 16, as the chain guide 18 moves between the third end position P3 and the fourth end position P4 while in the second mode.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The term "attached" or "attaching", as used herein, encompasses configurations in which an element directly secured to another element by affixing the element is directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Also, the terms "part," "section," "portion," "member" or "element" when used in the singular can have the dual meaning of a single part or a plurality of parts. Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired so long as they do not substantially their intended function. Components that are shown directly connected or contacting each other can have intermediate structures disposed between them unless specifically stated otherwise. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An electric front derailleur comprising:
   a base member including a bicycle mounting portion;
   a movable member being movable with respect to the base member;
   a driving unit operatively coupled to the movable member to move the movable member with respect to the base member; and
   a controller programmed to selectively operate the driving unit with one of a first mode which moves the movable member between a first end position and a second end position and a second mode which moves the movable member between a third end position and a fourth end position, and the controller being programmed to operate the driving unit to select a stop position of the movable member among only a first stop position, a second stop position and a third stop position while in the first mode, and the controller being programmed to operate the driving unit to select a stop position of the movable member between only a fourth stop position and a fifth stop position while in the second mode,
   at least one of the third end position and the fourth end position differing from the first end position and the second end position, and a first distance between the first and second stop positions differing from a second distance between the second and third stop positions.

2. The electric front derailleur according to claim 1, wherein
   the controller is configured to operate the driving unit to selectively position the movable member at a fourth stop position and a fifth stop position while in the second mode.

3. The electric front derailleur according to claim 2, wherein
   a third distance between the fourth and fifth stop positions differs from the first and second distances.

4. The electric front derailleur according to claim 1, wherein
   the third end position differs from the first end position and the second end position, and the fourth end position differs from the first end position and the second end position.

5. The electric front derailleur according to claim 1, wherein
   the controller includes an input interface that connects to a user operating device to switch between the first mode and the second mode.

6. The electric front derailleur according to claim 1, wherein
   the driving unit includes at least one link member movably coupling the movable member to the base member, the at least one link member being changeably configured to switch an actuation ratio between the first mode and the second mode.

7. The electric front derailleur according to claim 1, wherein
   the driving unit includes a connecting structure and an electric motor, the connecting structure being driven by the electric motor to move the movable member relative to the base member.

8. The electric front derailleur according to claim 7, wherein
   the connecting structure includes a driving link rotated by the electric motor, a driven link attached to the movable member and a connecting link connected between the driving link and the driven link.

9. The electric front derailleur according to claim 1, wherein
   the first end position is closer to the base member than the second and third end positions.

10. The electric front derailleur according to claim 9, wherein
    the third end position is closer to the base member than the second and fourth end positions.

11. The electric front derailleur according to claim 10, wherein
the fourth end position is closer to the base member than the second end position.

\* \* \* \* \*